Oct. 17, 1939.　　　　J. H. PLOEHN　　　　2,176,544
WHEEL ASSEMBLY
Filed May 15, 1937　　　　3 Sheets-Sheet 2

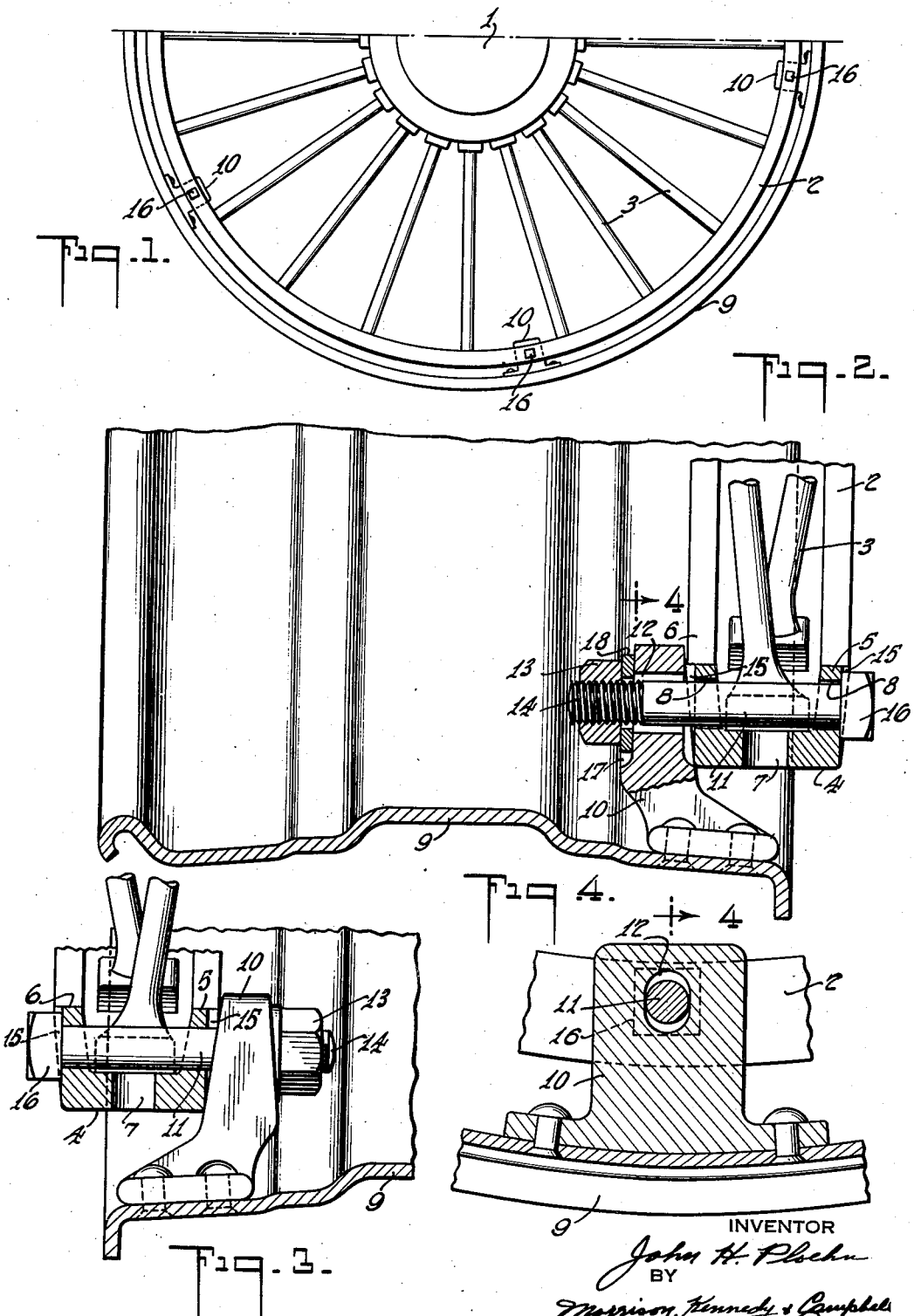

Fig. 5.

INVENTOR
John H. Ploehn
BY
Morrison, Kennedy & Campbell
ATTORNEYS

Oct. 17, 1939.  J. H. PLOEHN  2,176,544
WHEEL ASSEMBLY
Filed May 15, 1937  3 Sheets—Sheet 3

INVENTOR
John H. Ploehn
BY
Morrison, Kennedy & Campbell
ATTORNEYS.

Patented Oct. 17, 1939

2,176,544

UNITED STATES PATENT OFFICE 2,176,544

WHEEL ASSEMBLY

John H. Ploehn, Bettendorf, Iowa, assignor to French & Hecht, Incorporated, a corporation of Iowa Application May 15, 1937, Serial No. 142,777

8 Claims. (Cl. 301—41)

This invention relates to wheel structures, and particularly to wheels for vehicles of the class including tractors and farm machinery. In the use of vehicles of the class referred to, it is frequently necessary or desirable to vary the track of the wheels, that is the lateral distance between them, and also the form of traction surface employed to adapt the vehicle for use in different soil and working conditions. Obviously, the provision of different sets of wheels to give the desired variability would involve a great deal of expense; and the weight of the wheels would make the substitution of one set of wheels for another on the vehicle extremely laborious and difficult.

It is the primary object of the present invention, therefore, to provide a wheel assembly for readily adapting a tractor or other vehicle for use in different soil and working conditions, and, to this end, the invention contemplates the provision of a common supporting member in the form of a main wheel adapted to be mounted on the axle of the vehicle for supporting any one of a plurality of traction members each providing a different form of traction surface and which members are interchangeable at will.

Another object of the invention is to provide a wheel assembly of the character stated wherein each of the traction members may be supported in different positions axially of the main wheel in order to vary the track of the wheels.

Still another object of the invention is to form the main wheel and the traction members so that the latter may be located and attached to the main wheel in different positions axially thereof without removing the main wheel from the axle of the vehicle.

A further object of the invention is to provide means for securing the traction members to the main wheel so that the members will be self-centering with respect to the axis of the wheel when being secured thereto.

Yet another object of the invention is to provide an improved form of attachment of the traction members to the main wheel whereby the load forces on the attaching means are translated from shearing forces into tension forces.

In carrying out the invention, the main wheel of the assembly, as usual, comprises a hub and a rim connected in spaced relation by spokes or other means, and the interchangeable traction members are provided with brackets adapted to be secured to the wheel rim and formed to support the members radially with respect thereto so as to provide a wheel of uniform outside diameter for all forms of traction surfaces; and the brackets are constructed and arranged to support the members so that the traction surfaces thereof are offset axially of the main wheel rim.

In the accompanying drawings, the invention has been shown merely by way of example and in preferred form, but obviously many variations and modifications may be made therein and in its mode of application which will still be comprised within its spirit. It is to be understood, therefore, that the invention is not limited to any particular form or embodiment except insofar as such limitations are specified in the appended claims.

Referring to the drawings:

Fig. 1 is a side elevation of a portion of a wheel according to the present invention;

Fig. 2 is a fragmentary elevation, partly in section, showing the main wheel rim and a pneumatic tire rim secured thereto;

Fig. 3 is a fragmentary elevation, partly in section, of the parts shown in Fig. 2, but showing the pneumatic tire rim secured to the opposite side of the main wheel rim;

Fig. 4 is a fragmentary sectional view taken on the line 4—4 of Fig. 2, looking in the direction of the arrows;

Fig. 5 is a fragmentary elevation, partly in section, showing a cleated traction surface secured to the main wheel rim.

Figure 6:
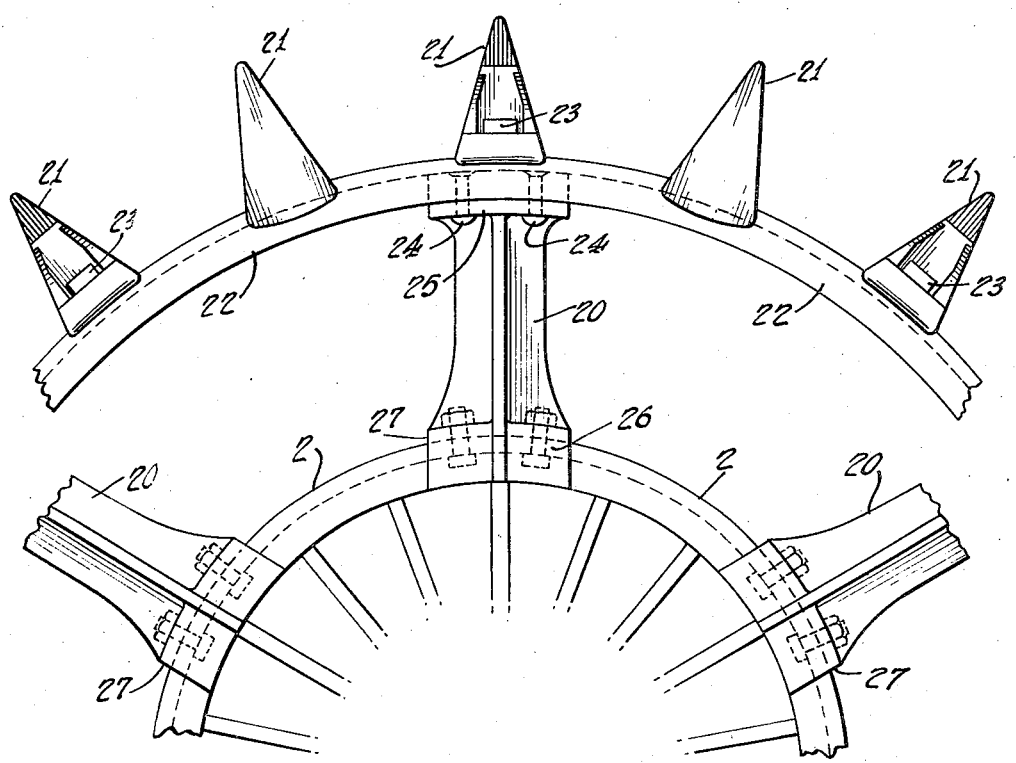
Fig. 6 is a fragmentary side view of the form of wheel structure shown in Fig. 5.

The main wheel, adapted to be mounted on the axle of the vehicle, comprises a hub 1 and a rim 2 connected in spaced relation by spokes 3. According to the present invention, the rim 2 is a narrow channeled rim presenting a flat continuous peripheral wall 4 and oppositely inclined side walls 5 and 6. The peripheral wall 4 is formed with a circumferential series of drill holes 7 to accommodate bolts for fastening the brackets supporting certain of the traction members, while the side walls 5 and 6 are formed with alined drill holes 8 to accommodate bolts for fastening other of the traction members.

Referring particularly to Figs. 1 to 4, there is shown a preferred manner of supporting the traction members on the main wheel rim 2. In this particular instance, a pneumatic tire rim 9 is shown provided with a circumferential series of short brackets or lugs 10 located near one side edge thereof to support the rim 9 in axially offset relation to the rim 2. The side faces of the brackets 10 are tapered to correspond to the inclination of the side walls of the wheel rim 2, and the tire rim 9 is secured to the wheel rim 2 by bolts 11 passing through the alined holes 8 formed in the side walls 5 and 6 and through holes 12 in the brackets 10, the inclined faces of the brackets 10 being drawn into clamping engagement with the side face 6 (Fig. 2) of the wheel rim 2 by the setting up of nuts 13 on threaded ends 14 of the bolts 11. In the regions of the bolt holes 8, the walls 5 and 6 of the rim 2 are formed with recesses 15 to provide straight surfaces against which the bolt heads 16 bear, and the brackets 10 are formed with recesses 17 to provide straight surfaces against which washers 18 on the bolts 14 bear to make solid engagement therewith throughout their entire areas. Referring to Figs. 2 and 4, it will be noted that the bolt holes 8 in the side walls 5 and 6 of the wheel rim are formed so that the bolts 11 fit snugly therein, while the holes 12 in the brackets 10 are elongated radially, the bolts fitting the holes snugly widthwise but not lengthwise. This arrangement prevents relative circumferential movement between the brackets 10 and the wheel rim 2 but permits relative movement radially for the purpose of mounting the tire rim on the wheel rim. Moreover, it renders perfect radial alinement with the holes 8 unnecessary in manufacture.

The inclination of the side walls 5 and 6 of the wheel rim and the faces of the brackets 10 is three-fold. First, it renders the traction members self-centering with respect to the axis of the wheel; second, it translates shearing load forces on the fastening bolts into tension forces; and third, it prevents relative radial movement between the brackets 10 and the wheel rim 2. By their inclination, the walls 5 and 6 present conical bearing surfaces centered with respect to the axis of the wheel and, hence, when the correspondingly inclined faces of the brackets 10 are drawn into clamping engagement therewith the tire rim 9 becomes automatically centered with respect to the axis of the wheel, the elongated opening of the holes 12 permitting a slight relative movement radially as the centering is effected. The second function of the inclined bearing surfaces, that of translating the shearing forces of the brackets 10 on the bolts 11 into tension forces, arises from the tendency of the brackets to be forced laterally under load instead of radially; and the tendency of their bearing surfaces to wedge together under load prevents relative radial movement between the brackets 10 and wheel rim 2.

Fig. 3 illustrates the manner of varying the track of the wheel by securing the tire rim 9 to the opposite side of the wheel rim 2 with the brackets 10 in engagement with the side wall 5, the rim 9 extending axially from the wheel rim 2 in the opposite direction from that shown in Fig. 2. It will be noted that in securing the wheel at this side of the rim 2 the bolts 11 have been reversed, now passing through the holes 8 in the side walls 5 and 6 from left to right instead of from right to left as in Fig. 2. Aside from the reversal of the rim 9 and bolts 11, with the resultant variance in the axial relation of the tire and wheel rims, the relationship and cooperation of the parts is the same as before.

It may be well to point out at this time that in effecting the change in the location of the tire rim 9 relatively to the wheel rim 2 it is unnecessary to remove the main wheel from the axle. Since the inside diameter of the rim 9 is greater than the outside diameter of the wheel rim 2, it is only necessary to tilt the rim 9 until some of the brackets 10 clear the rim 2, and then move the rim 9 radially relatively to the main wheel until the remaining brackets will clear the rim 2 and allow the rim 9 to be straightened, at which time all the brackets 10 will be located at the desired side of the wheel rim. It is also pointed out that both faces of the brackets 10 are beveled to engage the side walls 5 and 6, so that the rim 9 can be secured at either side of the rim 2 to extend in opposite directions axially relatively thereto, thereby providing four different axial positions of the traction surface relatively to the wheel rim 2.

In Figs. 5 and 6, a cleated traction surface is shown mounted on the main rim 2, the traction surface being supported by a circumferentially arranged series of long brackets 20 in order to maintain an outside wheel diameter equal to that provided by a penumatic tire carried by the rim 9 supported in close proximity to the main rim 2 by the short brackets 10. Cleats 21 are arranged in a common manner in two series circumferentially of a channeled ring 22 shaped similarly to the main wheel rim 2, being secured in wedge clamping engagement therewith in the usual manner by bolts 23. The channeled ring 22 is solidly secured to the brackets 20 as by rivets 24 passing through the ring 22 and a shouldered boss 25 formed to fit snugly between the side walls of the ring, thereby forming a solid metal to metal engagement in order to withstand severe intermittent shocks produced by the cleats striking the ground as the wheel rotates. A modified form of attachment of the brackets to the wheel rim is illustrated, wherein the lower ends of the brackets 20 are formed with depending flanges 26 having inclined bearing surfaces corresponding to the inclined side walls 5 and 6 of the wheel rim 2, and with horizontal flanges 27 adapted to overlie the peripheral walls 4 of the wheel rim 2. The flanges 27 are formed with drill holes 28 adapted to aline accurately with the holes 7 in the wall 4 to accommodate bolts 29 for securing the brackets to the wheel rim with the flanges 26 and 27, respectively, drawn into engagement with the top wall 4 and one of the side walls of the rim.

As in the case of the arrangement shown in Figs. 1 to 4, the brackets 20 may be secured to either side of the main wheel rim 2 without removing the latter from the axle and the track of the wheels thereby varied, due to the formation of the brackets 20 to support the cleated traction surface in axially offset relation to the main wheel rim 2, as shown by the full and broken lines. However, with the form of attachment of the brackets 20 to the wheel rim 2, the traction member may be supported in two positions only axially relatively to the rim 2. Moreover, there is some shearing action on the bolts 29, but while it is not wholly obviated it is, nevertheless, only a component of the load force.

Although only two traction members presenting two different forms of traction surfaces have been shown and described herein, it is to be understood that the invention is intended to embrace other forms of traction surfaces and variations thereof in their adaptation to provide a wheel assembly of the character set forth. Furthermore, while the two traction members have been disclosed as equipped with brackets formed differently for engagement with the main wheel rim, it is not intended that the forms shown shall be individual to the traction members with which they appear associated herein, since either may be employed with all traction members or with those only to which each may be best suited.

Having thus described my invention, what I claim is:

1. A wheel structure including, in combination, a wheel body adapted to be mounted on the axle of a vehicle and formed with a main rim having a cylindrical periphery and opposite side edges, a demountable member presenting the traction surface of the wheel, means attached to and extending radially inward from said demountable member and formed to be secured in facewise engagement with either side edge of the main rim to mount said member in different axial positions relatively thereto, said mounting means being formed to present circumferentially spaced radially inner attaching portions which engage the main rim and adapt the demountable member for location with said attaching portions in engagement with either side edge of the main rim while the wheel body remains mounted on the axle, and means to secure the mounting means to the main rim.

2. A wheel structure according to claim 1, wherein the mounting means are arranged on the demountable member and formed to support said member in axially offset relation to the main rim.

3. A wheel structure according to claim 1, wherein the main rim is formed of a channel member opening radially inward and having side walls oppositely inclined with respect to a plane perpendicular to the axis of the wheel.

4. A wheel structure according to claim 1, wherein the main rim is formed of a channel member opening radially inward and the side edges of the the main rim are formed by the walls of the channel member which present axially outer surfaces oppositely inclined with respect to a plane perpendicular to the axis of the wheel, and wherein the mounting means are formed with bearing surfaces correspondingly shaped for engagement with said axially outer surfaces of the walls of the channel member.

5. A wheel structure including, in combination, a wheel body adapted to be mounted on the axle of a vehicle and formed with a main rim having a cylindrical periphery and frusto-conical opposite side edges, a demountable member presenting a traction surface of the wheel, means attached to and extending radially inward from said demountable member and being formed to mount the member on the main rim in axially offset relation thereto, said mounting means presenting a series of arms having their radially inner ends formed for facewise engagement with either side edge of the main rim and which arms are in circumferentially spaced relation and adapt the demountable member for location with the ends of the arms in engagement with either side edge of the main rim while the wheel body remains on the axle, and means to secure the ends of said arms in clamping engagement with one or the other side edges of the main rim.

6. A wheel structure according to claim 5, wherein the mounting means comprise a series of brackets formed each with a conical bearing surface to engage either side edge of the main rim, as desired.

7. A wheel structure according to claim 5, wherein the mounting means comprise a series of brackets formed each with opposed conical bearing surfaces adapted each to engage either side edge of the main rim.

8. A wheel structure according to claim 5, wherein the mounting means comprise a series of brackets formed each with bearing surfaces adapted to engage the periphery and one side wall of the main rim.

JOHN H. PLOEHN.